Patented Feb. 18, 1947

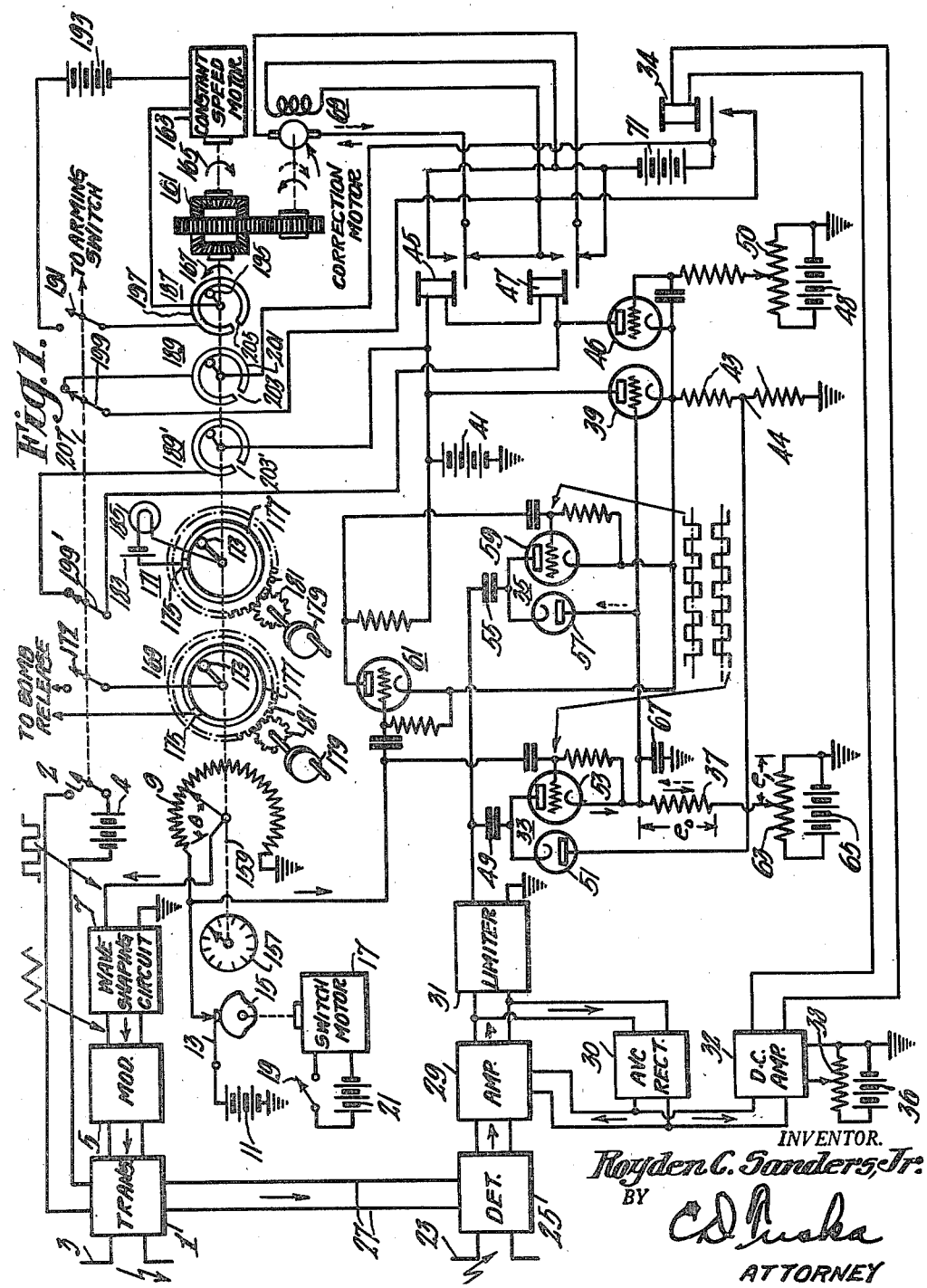

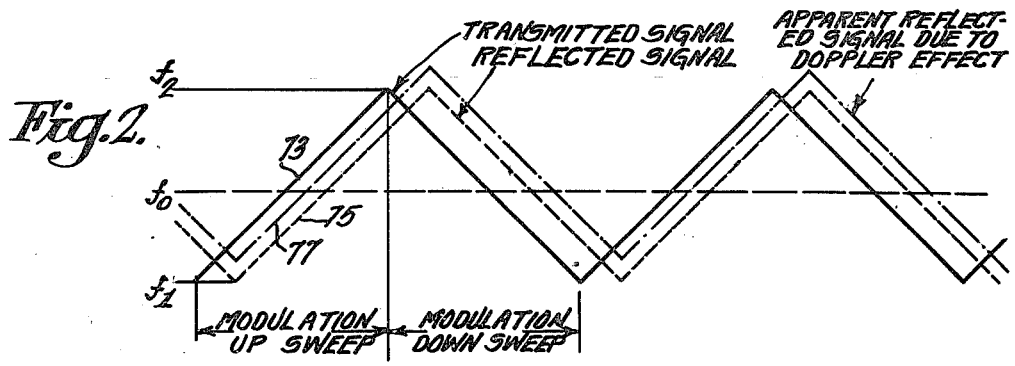
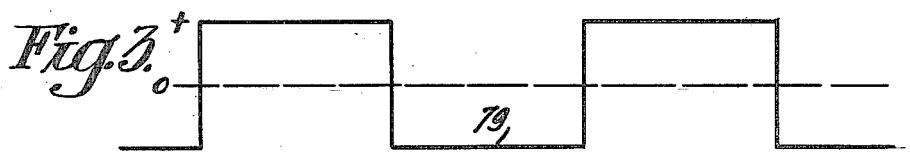
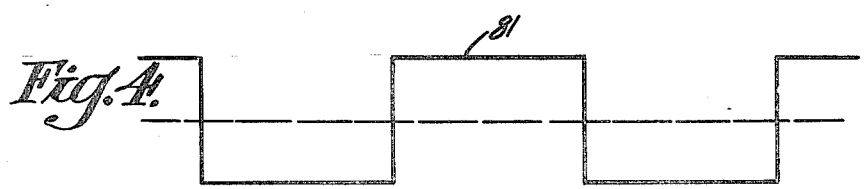
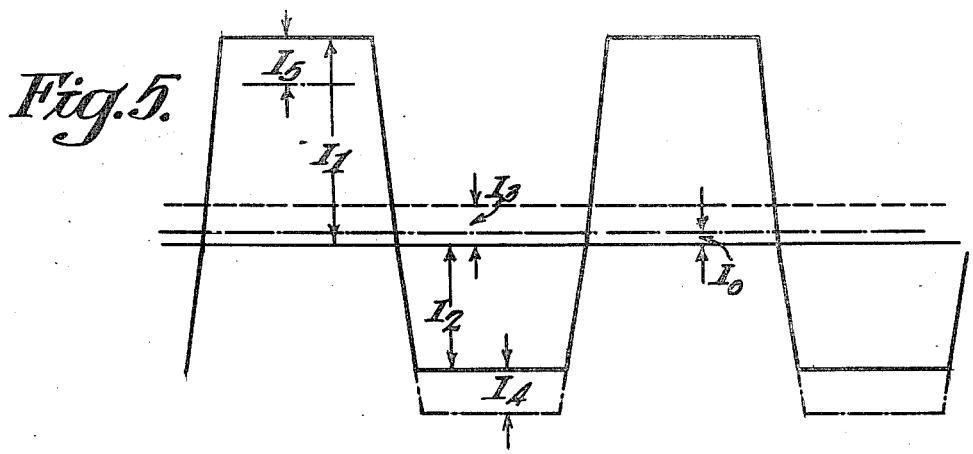

2,416,223

UNITED STATES PATENT OFFICE 2,416,223

RADIO BOMB RELEASE SYSTEM

Royden C. Sanders, Jr., Hightstown, N. J., assignor to Radio Corporation of America, a corporation of Delaware Application April 20, 1944, Serial No. 531,953

9 Claims. (Cl. 250—154)

This invention relates to automatic bomb release systems, and more particularly to the art of releasing bombs from aircraft in response to radio measurements of the distance of a target and the speed of the craft with respect to the target.

In my copending U. S. patent applications Serial Numbers 524,794, 524,795 and 524,796, filed on March 2, 1944, and entitled Radio bomb release systems, which applications are assigned to the same assignee as the instant application, I have described means for continuously measuring the distance of a target and the speed of the craft with respect thereto, and for releasing a bomb upon the occurrence of the predetermined relationship between these quantities which is required for a hit.

It is the principal object of the present invention to provide improved methods of and means for automatic bomb release, wherein the time of release is continuously predicted.

Another object is to provide improved methods of and means for automatic bomb release wherein continuous measurement of speed and distance up to the instant of release is not required.

A further object of this invention is to provide, in a radio bomb release system of the described type methods of and means for "remembering" the instant of release, whereby the time interval to elapse before release is continuously computed notwithstanding momentary failure of the signals employed for measurement of speed and distance.

Still another object is to provide, in a system of the described type, methods of and means for affording a warning that release is to occur at the end of a predetermined time interval.

These and other objects will become apparent to those skilled in the art upon consideration of the following description with reference to the accompanying drawings, of which Figure 1 is a schematic diagram of an embodiment of the invention, Figure 2 is a graph illustrating variations in frequency of signals transmitted and received in the operation of the system of Figure 1, Figures 3 and 4 are graphs of square wave switching voltages occurring in the operation of the system of Figure 1, and Figure 5 is a graph illustrating switched counter output currents produced in the operation of the system of Figure 1.

In the practice of the present invention, it is proposed to employ a continuously running clock, or its equivalent, to operate a circuit closer for actuating the bomb release mechanism. The clock is set back from its circuit closing position by an amount corresponding to the velocity of the aircraft divided by the distance from the target, at the instant of setting. Thus the clock will indicate continuously the "time from target," of period which will elapse before the target is reached. By means of radio reflection speed and distance measuring equipment of the type described in the above-mentioned copending applications, the clock setting may be made automatically and checked continuously, with automatic correction in response to variations in the speed of the craft with respect to the target.

Refer to Figure 1. A radio transmitter 1 is connected to an antenna 3 and to a frequency modulator 5. A switch 2 is connected in the anode supply circuit of the transmitter 1, which includes a battery 4. The modulator 5 may be of the vibratory variable capacitor type such as that described in copending U. S. patent application Serial Number 471,003, filed January 1, 1943, by S. V. Perry, and entitled Capacity modulator unit, or any other known device for varying the frequency of the transmitter 1 in response to a modulating voltage. The input circuit of the modulator 5 is connected to a wave shaping circuit 7 which is connected through a voltage divider 9 to a battery 11 and a periodic switch 13. The switch 13 is arranged to be operated by a cam 15 driven by a motor 17. The motor 17 is connected through a switch 19 to a power source such as a battery 21.

A receiving antenna 23, similar in construction to the antenna 3, is connected to a detector 25. The transmitter 1 is also connected to the detector 25 through a line 27. Both antennas 3 and 23 are preferably directive, and are arranged to provide maximum response in the same direction.

The output circuit of the detector 25 is connected to an amplifier 29, which is provided with an A. V. C. circuit including a rectifier 30 connected to rectify a portion of the amplifier output and apply the rectified voltage to a bias circuit of the amplifier in any known or conventional manner for controlling the amplifier gain. The output of the rectifier 30 is also applied to a D.-C. amplifier 32, which is connected to a relay 34. A D.-C. source comprising a battery 36 and a voltage divider 38 is connected to the amplifier 32 and adjusted to bias it so that the relay 34 is open in the absence of output from the amplifier 29, and closed when the output of the amplifier 29 exceeds a predetermined value. The output circuit of the amplifier 29 is connected to an amplitude limiter 31. The output circuit of the limiter 31 is connected to a pair of averaging cycle counter circuits, generally designated by the reference numerals 33 and 35, respectively.

The counters 33 and 35 are provided with a common load resistor 37, which is connected to the control grid of an amplifier tube 39. The anode of the tube 39 is connected directly to a D.-C. source 41. The cathode circuit of the tube 39 includes a resistor 43 tapped at a point 44. The cathode of the tube 39 is connected to the cathode of a tube 46. The control grid of the tube 46 is connected to a bias source including a battery 48 and a voltage divider 50. A pair of relays 45 and 47 are included in the anode circuit of the tube 46.

The counter 33 includes a capacitor 49 connected to the cathode of a diode 51 and to the anode of a triode 53. The control grid of the triode 53 is coupled to the switch 13. The cathode of the tube 53 is connected to the load resistor 37. The anode of the diode 51 is connected to the cathode circuit of the tube 39 at the point 44 on the resistor 43. The counter 35 comprises a capacitor 55 connected to the cathode of a diode 57 and to the anode of a triode 59. The control grid of the triode 59 is coupled through a phase inverter circuit 61 to the switch 13. The anode of the diode 57 is connected to the load resistor 37. The cathode of the triode 59 is connected to the cathode of the tube 39. The lower end of the resistor 37 is connected to a voltage divider 63, across a battery 65. The load resistor 37 is bypassed to ground by a capacitor 67.

The relays 45 and 47 are each provided with single pole double throw contact arrangements, connecting a reversible motor 69 to a battery 71, through the contacts of the relay 34. The relays 45 and 47 are adjusted so that the drop out current of the relay 45 just slightly exceeds the pick up current of the relay 47. Thus when the current flowing through the windings of the relays 45 and 47 is of a magnitude between that required to pick up the armature of the relay 47 and that which will allow the armature of the relay 45 to drop, the armature of the motor 69 is disconnected from the battery 71. When the current is less than that required to pick up the relay 47, current flows through the armature of the motor 69 in the direction indicated by the solid arrow, causing the motor to rotate in, for example, a clockwise direction. When the current is sufficient to pick up the armature of the relay 45, current flows through the armature of the motor 69 in the direction indicated by the dash arrow, causing rotation in the reverse direction. If the received signal fails, the relay 34 is energized, disconnecting the battery 71 from the circuit.

The operation of the system thus far described is as follows: The motor 17 operates the switch 13 by means of the cam 15 to connect the battery 11 periodically to the voltage divider 9, thus producing a square wave voltage variation of the voltage across the voltage divider 9. The square wave voltage is attenuated to an extent depending upon the position of the adjustable tap of the voltage divider 9, and is applied to the wave shaping circuit 7. The wave shaping circuit 7 includes a low pass filter or other means for integrating the square wave input with respect to time to produce an output of triangular wave shape. The triangular wave output of the wave shaping circuit 7 is applied to the modulator 5 causing corresponding triangular wave variation of the frequency of operation of the transmitter 1. The frequency modulated signal produced by the transmitter 1 is radiated by the antenna 3 to the target, not shown. Part of the energy striking the target is reflected to the receiving antenna 23. The received reflected signal is combined in the detector 25 with some of the original frequency modulated signal, which is conducted directly from the transmitter 1 to the detector 25 through the line 27. The output of the detector 25 includes a beat signal having a frequency equal to the difference between the instantaneous frequency of the transmitted and received signals. The beat output of the detector 25 is amplified by the amplifier 29 and limited to a constant amplitude by the limiter 31. The output of the limiter 31 is a square wave voltage having a frequency equal to the difference between the frequency of the transmitted and received signals and a constant amplitude, Es.

Referring to Figure 2, the frequency of the transmitted signal is represented by the solid line 73. This frequency varies throughout the modulation cycle in response to the triangular wave output of the wave shaping circuit 7, between upper and lower limits $f_2$ and $f_1$, respectively, about a mean value $f_0$. The sweep width $f_2-f_1$ is proportional to the amplitude of the triangular wave input to the modulator 5, and hence is a function of the position of the adjustable contact of the voltage divider 9. The reflected signal is delayed with respect to the transmitted signal by the time required for the radiation to travel from the transmitting antenna 3 to the target, and back to the receiving antenna 23. This is indicated by the dotted line 75 in Figure 2. The reflected signal varies in frequency over the same range $f_2-f_1$ as the transmitted signal, but constantly differs in frequency from the transmitted signal by an amount proportional to the distance. This difference in frequency is $$\frac{Sf_m d}{246}$$

cycles per second, where $S=f_2-f_1$ in megacycles per second, $f_m$ is the modulation frequency in cycles per second, or frequency of operation of the switch 13, and $d$ is the distance in feet. If the equipment is moving toward the target, the received signal is increased in frequency, owing to Doppler effect, by an amount $$\frac{2vf_0}{C}$$

where $v$ is the velocity in feet per second, $f_0$ is the carrier frequency in cycles per second and $C$ is the velocity of radiation propagation in feet per second. The frequency of the received signal is represented by the dash line 77 in Figure 2. This frequency varies throughout the modulation cycle over a frequency band which is equal in width to that of the transmitted signal. The difference in frequency between the transmitted and the received signal is $$f_u = \frac{Sf_m d}{246} - \frac{2vf_0}{C}$$

cycles per second during increase in frequency of the transmitted signal, and $$f_d = \frac{Sf_m d}{246} + \frac{2vf_0}{C}$$

cycles per second during decrease in frequency of the transmitted signal.

The constant amplitude beat frequency output of the limiter 31 is applied to both of the counters 33 and 35. During the modulation upsweep, or increase in frequency of the transmitted signal, the switch 13 is closed, applying a positive pulse to the control grid of the triode 53 and to the phase inverter 61, as indicated by the graph of Figure 3. The phase inverter 61 provides a negative pulse which is applied to the control grid of the triode 59 of the counter 35, as indicated by the graph of Figure 4. The triode 59 is thereby cut off, and the counter 35 prevented from operating. The triode 53 is conductive, allowing the capacitor 49 to charge through the resistor 37 during positive half cycles of the output of the limiter 31. During negative half cycles of the limiter output, the capacitor 49 is discharged through the diode 51 to the potential appearing at the lower end of the resistor 43, which is slightly less than the potential at the cathode of the tube 39 and hence the cathode of the tube 53. The values of the capacitor 49 and resistor 37 are such that the capacitor 49 becomes substantially fully charged to the limiter output voltage $E_s$ during each cycle of the limiter output. Thus during the modulation upsweep, the counter 33 causes a current $i_u$ to flow downward through the resistor 37, as indicated by the solid arrow. This current is proportional to the product of the charge deposited in the capacitor 49 during each cycle, and the number of cycles per second:

$$i_u = f_u Q = f_u C_1 E_s$$

where $f_u$ is the beat frequency, $Q$ is the charge per cycle, $C_1$ is the capacitance of the capacitor 49, and $E_s$ is the amplitude of the output of the limiter 31. Since $$f_u = \frac{Sf_m d}{246} - \frac{2vf_0}{C}$$

$$i_u = \frac{Sf_m d}{246} C_1 E_s - \frac{2f_0 v}{C} E_s C_1$$

During the modulation downsweep, the switch 13 is open, providing a negative pulse at the grid of the triode 53 and the phase inverter 61, and a positive pulse at the grid of the triode 59, as indicated by the portions 79 and 81, respectively, of the graphs of Figures 3 and 4. The counter 33 is now inoperative and the triode 59 is conductive. During negative half cycles of the limiter output, the capacitor 55 is charged through the diode 57 and the resistor 37. During positive half cycles, the capacitor 55 is discharged through the triode 59 to the potential existing at the cathode of the tube 39, which is substantially equal to that at the anode of the diode 57. Thus during the modulation downsweep, the counter 35 causes an average current $i_d$ to flow upward through the resistor 37 as indicated by the dash arrow. This current is proportional to the product of the charge deposited in the capacitor 55 during each cycle, and the number of cycles per second:

$$i_d = f_r Q = f_r C_2 E_s$$

where $C_2$ is the capacitance of the capacitor 55. Since $$f_d = \frac{Sf_m d}{246} + \frac{2vf_0}{C}$$

$$i_d = \frac{Sf_m d}{246} C_2 E_s + \frac{2f_0 v}{C} E_s C_2$$

The average current through the resistor 37 is $$i_0 = i_u - i_d$$

$$i_0 = \frac{Sf_m d}{246} E_s (C_1 - C_2) - \frac{2f_0 v}{C} E_s (C_1 + C_2)$$

Refer to Figure 5, wherein $I_1$ is the average component of current during upsweep due to distance, $I_2$ is the average component of current during downsweep due to distance, $I_3$ is the resultant average component of current due to distance, $I_4$ is the increase in negative average component of current during downsweep due to speed, and $I_5$ is the decrease in positive average current during upsweep due to speed. The resultant average voltage across the resistor 37 is $$e_0 = i_0 R$$

where R is the resistance of the resistor 37.

The tap of the voltage divider 63 is adjusted to apply a positive potential of, for example, approximately 70 volts to the lower end of the resistor 37. The purpose of this arrangement is to provide a suitable operating point for the cathode follower tube 39. Denoting this voltage as $e_1$, the total voltage at the control grid of the tube 39, referred to ground potential, is $e_0 + e_1$. Inasmuch as the entire load of the tube 39 is in the cathode circuit, the anode current will assume a value such that the drop in said load circuit is very slightly greater than the voltage between the control grid and ground, and as a practical matter, substantially equal to the grid voltage. Thus the anode current $i_p$ of the tube 39 is substantially proportional to the voltage $e_0 + e_1$.

The relays 45 and 47, voltage divider 50 and the bias voltage $e_1$, are adjusted so that the motor 69 is disconnected from the battery 71, as described above, when $e_0 = 0$. Under this condition, $$0 = i_0 R$$

and $$\frac{Sf_m d}{246}(C_1 - C_2) = \frac{2f_0 v}{C}(C_1 + C_2)$$

This may be rewritten as:

$$\frac{d}{v} = \frac{2f_0(C_1 + C_2).246}{Sf_m(C_1 - C_2).C}$$

$$\frac{d}{v}$$

is the distance to the target divided by the speed of approach to the target, and is therefore the time T which will be required to reach the target. In the present example, the quantities $f_m$, $f_0$, $C_1$ and $C_2$ remain constant, while S may be varied by means of the voltage divider 9. Accordingly, $$T = \frac{k}{s}$$

where $$k = \frac{492 f_0 (C_1 + C_2)}{f_r C (C_1 - C_2)}$$

Thus it is apparent that the sweep width S is inversely proportional to the time from target, T, and the position to which the voltage divider 9 must be adjusted to prevent the motor 69 from running is a measure of the time T. The value of $k$, the proportionality constant between the reciprocal of the sweep width and the time T from target, may be predetermined in accordance with practical considerations by proper choice of the constants $f_m$, $f_0$, $C_1$ and $C_2$.

The voltage divider 9 is constructed to provide a reciprocal attenuation vs. rotation characteristic, i. e., the resistance is tapered so that the sweep width S is inversely proportional, over the operating range of the equipment, to the angular position $\theta$ of the adjustable tap, as indicated on Figure 1 of the drawings. It is evident that this characteristic could not be carried out to $\theta=0$, since infinite sweep width S would be required at this point. Similarly, the operating range is limited to a finite maximum distance, with a corresponding minimum sweep width. However, the voltage divider may be designed so that $\theta$ is proportional to $$\frac{1}{T}$$

over any selected range.

An indicator 157 is coupled to the adjustable tap of the voltage divider 9 by a shaft 159, and is provided with a scale calibrated in seconds or other suitable units of time from target. The shaft 159 is coupled through a differential gear assembly 161 to a clock motor 163 or other constant speed driving means. The spider of the differential 161 is coupled to the motor 69. The clock motor 163 runs in the direction of the arrow 165, so that if the motor 69 remains stationary, the shaft 159 is driven as shown by the arrow 167, rotating the indicator 157 toward zero, and with it the tap of the voltage divider 9.

A pair of switches 169 and 171 are coupled to the shaft 159. Each comprises a rotatable contact 173 and an angularly adjustable contact 175. The contact 175 is supported in a ring 177 of insulating material, which may be rotated for adjustment by means of a handwheel 179 and gearing 181. The contacts 173 and 175 of the switch 169 are connected to a bomb release mechanism, not shown. A switch 172 is connected in series with the switch 169. The contacts 173 and 175 of the switch 171 are connected between a battery 183 and an electric lamp 185 or other signalling or warning device.

A battery 193 is connected to the constant speed motor 163 through a switch 191 and a rotary switch 187. The switch 187 comprises a rotatable contact 195 coupled to the shaft 159 and a fixed contact 197 in the form of a sector covering an angle approximately equal to the range of motion of the movable contact of the voltage divider 9.

A switch 189, similar in construction to the switch 187, is connected through a switch 199 across the contacts of the relay 34. The fixed contact sector 201 of the switch 189 forms almost a complete circle with a small gap 203 placed at a point such that when the shaft 159 is in the position at which the switch 189 is open, the rotatable contact 195 of the switch 187 is barely out of contact with the starting end 205 of the fixed sector 197 of switch 187. A switch 189', identical in construction and adjustment with the switch 189, is connected, through a switch 199', across the windings of the motor control relays 45 and 47.

The switches 2, 172, 199, 199' and 191 are mechanically ganged together as indicated by the dash line 207, and connected to common operating means such as an arming switch or the like, not shown. In the "disarmed" position, the switches 199 and 199' are closed, and the remainder of the switches are open, while in the "armed" position, switches 199 and 199' are open and the other switches are closed.

With the switches in the position shown in Figure 1, the transmitter 1 is shut off, the bomb release mechanism is disconnected from the switch 169, the constant speed motor 163 is deenergized, and the motor 69 energized by means of the switches 189 and 189' to drive the shaft 159, through the differential 161, to a position such that the rotatable contacts of the switches 189 and 189' rest upon their insulating segment 203 and 203'. The mechanism is thus set at its starting position, where it remains until the arming switch is closed, closing switches 2, 172, 191 and opening the switches 199 and 199'. The motors 163 and 69 remain deenergized until a signal is picked up by the receiving equipment, operating the A. V. C. rectifier 30 and closing the contacts of the relay 34. If the ratio $d/v$ as determined by the radio equipment is not equal to the time T indicated by the indicator 157 at the starting position of the shaft 159, the relays 45 and 47 are operated to energize the motor 69, which rotates the spider of the differential 161, moving the shaft 159 in the direction of the arrow 167. The initial movement of the shaft 159 closes the switch 187, starting the constant speed motor 163. Thenceforth the motor 163 drives the indicator 157, through the differential 161 and the shaft 159, to indicate continuously the time from target. The voltage divider 9 is driven similarly to maintain the sweep width S at the value corresponding to the time T.

If the ratio $d/v$ as determined by the radio equipment does not remain equal to the time T indicated by the indicator 157, the motor 69 is energized as described above, and again rotates the spider of the differential 161, adding to or subtracting from the motion of the shaft 159 the correction necessary to make the sweep width correspond to $d/v$. Thereupon the motor 69 stops, and the clock motor continues to drive the indicator 157 at a uniform rate until further correction becomes necessary. If the reflection signal fails, the relay 34 opens, disconnecting the motor 69, and the indicator will continue to function, although no corrections will be made until it resumes.

The switch 169 is adjusted by its handwheel 179 to an angular position corresponding to the time from target at which a bomb is to be dropped. This time is determined by the speed and the altitude of the aircraft. The switch 171 may be adjusted similarly to close at any desired time before the time of release, to energize the lamp 185 and warn the operator or pilot that the bomb is about to be dropped. The switch 171 may be replaced by an auxiliary contact on the switch 169, if desired.

The invention has been described as an automatic bomb release system, wherein a switch mechanism is driven by a clock or constant speed motor. The clock is set back automatically from its switch closing position by an amount equal to the distance of the target divided by the rate of approach to the target, in response to speed and distance measurements made by reflected frequency modulated radiation.

It will be apparent to those skilled in the art that various modifications of the invention can be made. For example, the carrier frequency $f_0$ or the modulation frequency $f_m$ may be varied, rather than the sweep width S, although the latter is preferred at present. The speed and distance measuring circuits described in copending U. S. application Serial Number 524,795, filed on March 2, 1944, by Royden C. Sanders, Jr., and entitled Radio bomb release systems may be substituted for the switched counters 33 and 35 in the system of Figure 1. A single polarized relay may replace the marginal relays 45 and 47 without substantially altering the operation of the system.

I claim as my invention:

1. An automatic bomb release system for aircraft, including means differentially responsive to the distance and the speed of a craft with respect to a target, means including a shaft for varying the extent of the response of said differentially responsive means to said distance, means for driving said shaft normally at a constant speed, means responsive to the output of said differentially responsive means to superimpose upon said constant speed drive a further rotation of said shaft to adjust said response to distance to a value such that the output of said differentially responsive means is zero, and circuit closing means responsive to the attainment by said shaft of a predetermined angular position.

2. An automatic bomb release system for aircraft, including means differentially responsive to the distance and the speed of a craft with respect to a target, means including a shaft for varying the extent of the response of said differentially responsive means to said distance, driving means coupled to said shaft to drive said shaft normally in the direction to increase the extent of the response of said differentially responsive means to said distance, means responsive to the output of said differentially responsive means to superimpose upon said normal drive a further rotation of said shaft to adjust said response to distance to a value such that the output of said differentially response means is zero, and circuit closing means responsive to the attainment by said shaft of a predetermined angular position.

3. An automatic bomb release system for aircraft, including means differentially responsive to the distance and the speed of a craft with respect to a target, means including a shaft for varying the extent of the response of said differentially responsive means to said distance in predetermined proportion to the reciprocal of the angle of rotation of said shaft, constant speed driving means coupled to said shaft to drive said shaft normally at a constant speed in the direction to increase the extent of the response of said differentially responsive means to said distance, means responsive to the output of said differentially responsive means to superimpose upon said constant speed drive a further rotation of said shaft to adjust said response to distance to a value such that the output of said differentially responsive means is zero, and means responsive to the attainment by said shaft of a predetermined angular position to release a bomb.

4. An automatic bomb release system for aircraft, including means differentially responsive to the distance and the speed of a craft with respect to a target, means including a shaft for varying the extent of the response of said differentially responsive means to said distance in predetermined proportion to the reciprocal of the angle of rotation of said shaft, driving means coupled to said shaft to drive said shaft normally in the direction to increase the extent of the response of said differentially responsive means to said distance, means responsive to the output of said differentially responsive means to superimpose upon said normal drive a further rotation of said shaft to adjust said response to distance to a value such that the output of said differentially responsive means is maintained at a predetermined magnitude, and circuit closing means responsive to the attainment by said shaft of a predetermined angular position.

5. A bomb release system including means for radiating a frequency modulated signal to a selected target, means for receiving said frequency modulated signal after reflection by said target, means responsive to said transmitted signal and to said received signal to produce a beat signal, means responsive to said beat signal to produce an output voltage comprising a component bearing a predetermined ratio to the average frequency of said beat signal and a second component in opposition to said first component and bearing a predetermined ratio to the range of variation of frequency of said beat signal, means for controlling the range of cyclical variation in frequency of said frequency modulated signal, said last mentioned means including a shaft, means for driving said shaft normally at a constant speed, means responsive to said composite voltage to superimpose upon said constant speed drive a further rotation of said shaft to adjust said range of frequency variation to a value such that opposed components of output voltage are equal, and circuit closing means responsive to the attainment by said shaft of a predetermined angular position.

6. A bomb release system including radio transmitter means, modulator means for varying cyclically the frequency of operation of said transmitter means to provide a frequency modulated signal, means for radiating said frequency modulated signal to a selected target, means for receiving said frequency modulated signal after reflection by said target, detector means coupled to said transmitter means and to said receiving means and responsive to said transmitted signal and to said received signal to produce a beat signal having an average frequency proportional to the distance of an aircraft from said target, and a range of variation of frequency proportional to the speed of said craft with respect to said target, means responsive to said beat signal to produce a composite output voltage comprising a component bearing a predetermined ratio to said average beat frequency and a second component in opposition to said first component and bearing a predetermined ratio to said range of variation of beat frequency, means connected to said modulator means to control the range of cyclical variation in frequency of said frequency modulated signal, said last mentioned means including a shaft and a voltage divider coupled thereto and designed so that said range of variation of frequency is in predetermined proportion to the reciprocal of the angular position of said shaft, constant speed driving means coupled to said shaft through differential gearing to drive said shaft normally at a constant speed in the direction to increase said range of variation of frequency, means responsive to said composite voltage and coupled to said differential gearing to superimpose upon said constant speed drive a further rotation of said shaft to adjust said range of frequency variation to a value such that said opposed components of composite voltage are equal, and circuit closing means coupled to said shaft and responsive to the attainment thereby of a predetermined angular position.

7. A bomb release system including means for radiating a frequency modulated signal to a selected target, means for receiving said frequency modulated signal after reflection by said target, means responsive to said transmitted signal and to said received signal to produce a beat signal, means responsive to said beat signal to produce an output voltage comprising a component bearing a predetermined ratio to the average frequency of said beat signal and a second component in opposition to said first component and bearing a predetermined ratio to the range of variation of frequency of said beat signal, means for controlling the range of cyclical variation in frequency of said frequency modulated signal, said last mentioned means including a shaft, means for normally driving said shaft continuously, means responsive to said composite voltage to superimpose upon said normal drive a further rotation of said shaft to adjust said range of frequency variation to a value such that said output voltage is maintained at a predetermined magnitude and circuit closing means responsive to the attainment by said shaft of a predetermined angular position.

8. An automatic bomb release system for aircraft, including means differentially responsive to the distance and the speed of a craft with respect to a target, means including a shaft for varying the extent of the response of said differentially responsive means to said distance, means for driving said shaft normally to continuously change the extent of the response of said differentially responsive means to said distance, means responsive to the output of said differentially responsive means to superimpose upon said normal drive a further rotation of said shaft to adjust said response to distance to a value such that the output of said differentially responsive means is maintained at a predetermined magnitude and circuit closing means responsive to the attainment by said shaft of a predetermined angular position.

9. An automatic bomb release system for aircraft, including means differentially responsive to the distance and the speed of a craft with respect to a target, means including a shaft for varying the extent of the response of said differentially responsive means to said distance, means for normally driving said shaft continuously, means responsive to the output of said differentially responsive means to superimpose upon said normal continuous drive a further rotation of said shaft to adjust said response to distance to a value such that the output of said differentially responsive means is maintained at a predetermined magnitude, and circuit closing means responsive to the attainment by said shaft of a predetermined angular position.

ROYDEN C. SANDERS, Jr.

REFERENCES CITED

The following references are of record in the file of this patent:

UNITED STATES PATENTS

| Number | Name | Date |
| --- | --- | --- |
| 2,026,912 | Procofieff-Seversky | Jan. 7, 1936 |